United States Patent
Kelnhofer

(10) Patent No.: US 9,221,543 B2
(45) Date of Patent: Dec. 29, 2015

(54) COMPRESSOR/TURBINE ARRANGEMENT, AIR CONDITIONING UNIT AND METHOD FOR OPERATING A COMPRESSOR/TURBINE ARRANGEMENT

(75) Inventor: Juergen Kelnhofer, Jork (DE)

(73) Assignee: Airbus Operations GmbH, Hamburg (DE)

( * ) Notice: Subject to any disclaimer, the term of this patent is extended or adjusted under 35 U.S.C. 154(b) by 697 days.

(21) Appl. No.: 13/639,624

(22) PCT Filed: Apr. 5, 2011

(86) PCT No.: PCT/EP2011/001688
§ 371 (c)(1),
(2), (4) Date: Nov. 26, 2012

(87) PCT Pub. No.: WO2011/124361
PCT Pub. Date: Oct. 13, 2011

(65) Prior Publication Data
US 2013/0067945 A1    Mar. 21, 2013

Related U.S. Application Data

(60) Provisional application No. 61/321,156, filed on Apr. 6, 2010.

(30) Foreign Application Priority Data

Apr. 6, 2010  (DE) .......................... 10 2010 013 956

(51) Int. Cl.
*B60H 1/32*    (2006.01)
*F25D 17/02*    (2006.01)
(Continued)

(52) U.S. Cl.
CPC ............... *B64D 13/08* (2013.01); *B64D 13/06* (2013.01); *F25B 11/00* (2013.01);
(Continued)

(58) Field of Classification Search
CPC ........ F25B 11/00; B64D 13/06; B64D 13/08; B64D 2013/0688; B60H 1/00021; B60H 1/00028; B60H 2001/00092; B60H 2001/0015
USPC ........ 62/239, 241, 244, 98, 186, 207, 401, 86
See application file for complete search history.

(56) References Cited

U.S. PATENT DOCUMENTS

| 5,309,724 A | 5/1994 | Schreiber et al. |
| 6,519,969 B2 * | 2/2003 | Sauterleute ..................... 62/401 |
| 2001/0004837 A1 | 6/2001 | Sauterleute |

FOREIGN PATENT DOCUMENTS

| CN | 101495372 | 7/2009 |
| DE | 199 63 280 | 8/2001 |

(Continued)

OTHER PUBLICATIONS

Chinese Office Action dated Jul. 3, 2014 in CN 201180017751.9 and English Summary of First Office Action Text, 6 pages.
(Continued)

*Primary Examiner* — Mohammad M Ali
*Assistant Examiner* — Daniel C Comings
(74) *Attorney, Agent, or Firm* — Nixon & Vanderhye P.C.

(57) ABSTRACT

The invention relates to a compressor/turbine arrangement for use in an air conditioning unit of an aircraft air conditioning system comprising a process air supply line which is designed to supply process air generated by a process air source to a compressor. A detection device is designed to detect a characteristic signal for the temperature of the process air flowing through the process air supply line. A turbine is designed to drive the compressor. A cooling device is disposed in a process air line connecting the compressor to the turbine and is designed to cool the process air coming out of the compressor and flowing through the process air line in the direction of the turbine. Downstream of the cooling device a connecting line branches off from the process air line and opens into the process air supply line. A control device is designed to control a process air flow through the connecting line in dependence on the signal detected by the detection device.

12 Claims, 9 Drawing Sheets

(51) Int. Cl.
  *F25D 9/00* (2006.01)
  *F25D 17/04* (2006.01)
  *B64D 13/08* (2006.01)
  *F25B 11/00* (2006.01)
  *B64D 13/06* (2006.01)
  *B60H 1/00* (2006.01)

(52) U.S. Cl.
  CPC ........ *B60H 1/00021* (2013.01); *B60H 1/00028* (2013.01); *B60H 2001/0015* (2013.01); *B60H 2001/00092* (2013.01); *B64D 2013/0688* (2013.01); *Y02T 50/44* (2013.01)

(56) References Cited

FOREIGN PATENT DOCUMENTS

| | | |
|---|---|---|
| EP | 1 112 930 | 7/2001 |
| EP | 1 555 295 | 7/2005 |
| GB | 686 549 | 1/1953 |
| WO | WO 98/27389 | 6/1998 |

OTHER PUBLICATIONS

International Search Report for PCT/EP2011/001688, mailed Jul. 21, 2011.

* cited by examiner

COMPRESSOR/TURBINE ARRANGEMENT, AIR CONDITIONING UNIT AND METHOD FOR OPERATING A COMPRESSOR/TURBINE ARRANGEMENT

This application is the U.S. national phase of International Application No. PCT/EP2011/001688, filed 5 Apr. 2011, which designated the U.S. and claims priority to German Application No. 10 2010 013 956.4, filed 6 Apr. 2010, and U.S. Provisional Application No. 61/321,156, filed 6 Apr. 2010, the entire contents of each of which are hereby incorporated by reference.

The invention relates to a compressor/turbine arrangement provided for use in an air conditioning unit of an aircraft air conditioning system, to an air conditioning unit for an aircraft air conditioning system and to a method for operating a compressor/turbine arrangement provided for use in an air conditioning unit of an aircraft air conditioning system.

So-called air-based air conditioning systems are usually used at present in commercial aircraft to air-condition the aircraft cabin. An aircraft air conditioning system serves to cool the aircraft cabin, which would otherwise be overheated due to thermal loads, such as, e.g. insolation, body heat of the passengers and waste heat from equipment present on board the aircraft. The aircraft air conditioning system in addition adequately supplies fresh air into the aircraft cabin to ensure that a prescribed minimum proportion of oxygen is present in the aircraft cabin. The operating principle of an air-based air conditioning system which is commonly used at present is illustrated in FIG. 1.

Figure 1:
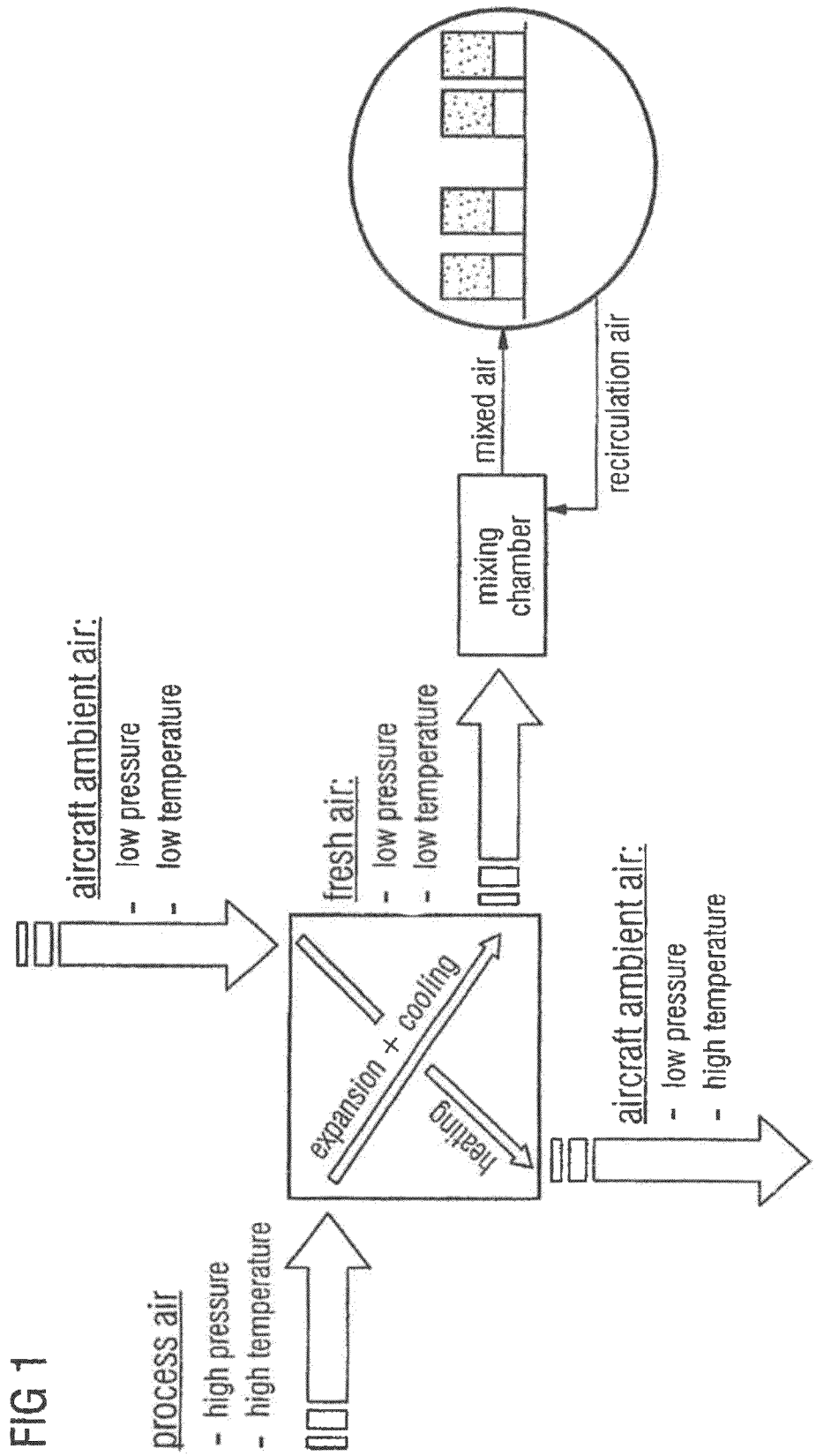

In the aircraft air conditioning system which is shown in FIG. 1 hot process air, which is either bled off the aircraft engines or produced by compressors formed separately from the engines when the aircraft is in flight, is supplied to an air conditioning unit. The process air, which is supplied at a high temperature and under high pressure, is treated in the air conditioning unit upon flowing through a heat exchanger unit as well as a compression and expansion unit such that it leaves the compression and expansion unit as expanded and cooled process air. The expanded and cooled process air is supplied as fresh air to a mixing chamber, where it is mixed with recirculation air removed from the aircraft cabin. The air mixture of fresh air and recirculation air which is produced in the mixing chamber is finally led into the aircraft cabin.

Figure 2:
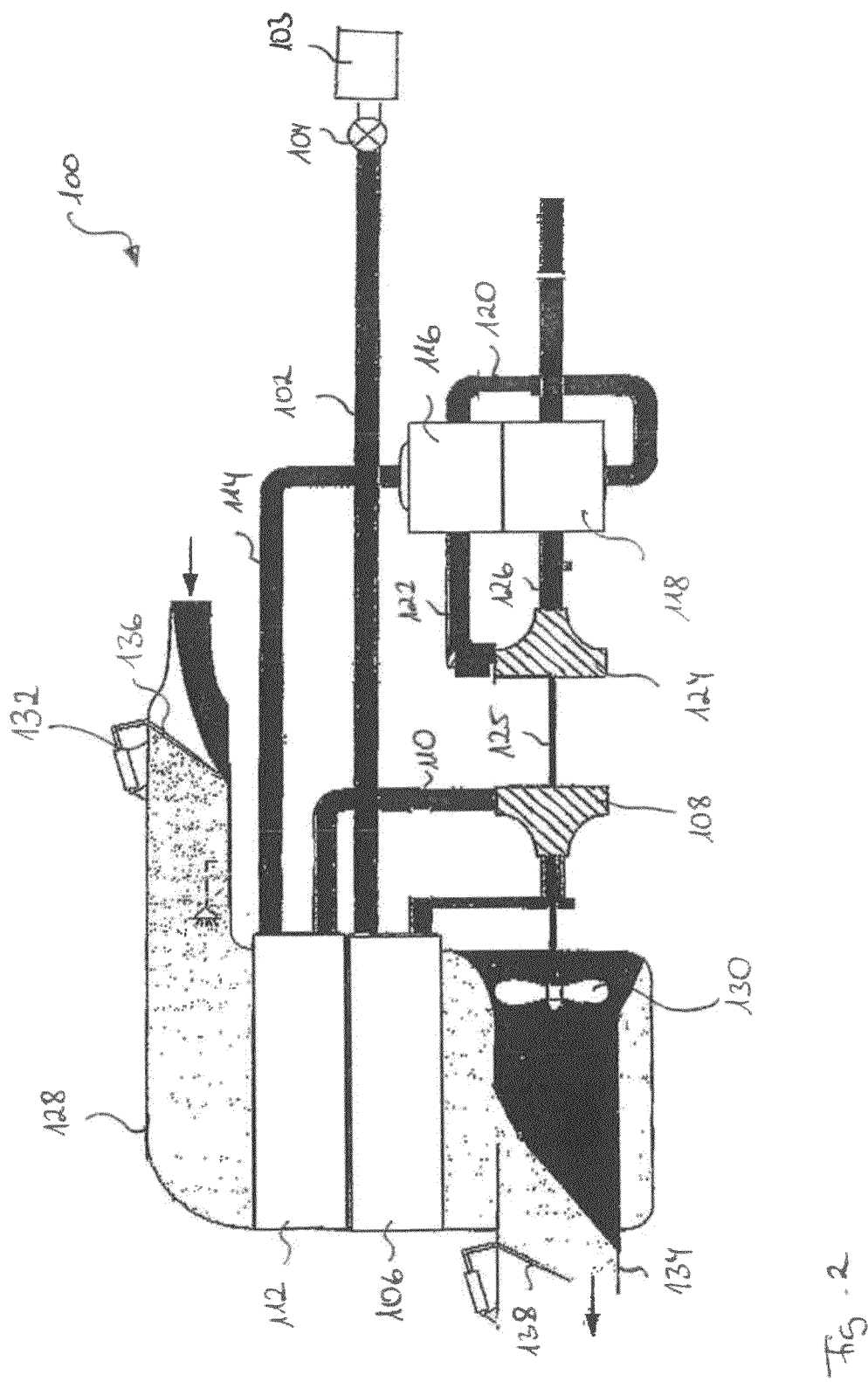

The structure of an air conditioning unit 100 commonly used at present can be seen in FIG. 2. The air conditioning unit 100 comprises a process air supply line 102, via which hot process air generated by a process air source 103 embodied in the form of an aircraft engine or a separate compressor is supplied to the air conditioning unit 100 at a high pressure. To control the process air flow through the process air supply line 102, a control valve 104 is arranged in the process air supply line 102. The air flowing through the process air supply line 102 is led through a first heat exchanger 106, cooled to approx. 40° C. to 100° C. in the process and subsequently supplied to a compressor 108. In the compressor 108, the process air is compressed and heated in the process. In order to avoid damage to the compressor 108 and/or components of the air conditioning unit 100 arranged downstream of the compressor 108, the heating of the air on flowing through the compressor 108 must, however, be limited to temperatures of approx. 220 C. to 260° C. The cooling of the process air, to be supplied to the compressor 108, by means of the first heat exchanger 106 therefore enables a higher compression of the process air in the compressor 108 and consequently the realisation of a higher cooling capacity of the air conditioning unit 100.

From the compressor 108, the compressed process air is supplied via a line 110 to a second heat exchanger 112, is cooled on flowing through the second heat exchanger 112 and is subsequently led via a line 114 to a third and a fourth heat exchanger 116, 118 for further cooling. Process air exiting the fourth heat exchanger 118 is returned via a line 120 to the third heat exchanger 116 and on flowing through the third heat exchanger 116 again is heated by heat transfer by the air led via the line 114 from the second heat exchanger 112 into the third heat exchanger 116. The heated process air is supplied via a line 122 to a turbine 124. In the turbine 124, the air is expanded and in the process cooled again. The compressor 108 is arranged with the turbine 124 on a common shaft 125 and is driven by the turbine 124. The process air exiting the turbine 124 is finally supplied via a line 126 to the fourth heat exchanger 118 once again. On flowing through the fourth heat exchanger 118 again, the process air exiting the turbine 124 is heated once again by heat transfer by the air led via the line 114 from the second heat exchanger 112 into the third and subsequently the fourth heat exchanger 116, 118.

The first and the second heat exchanger 106, 112 are each arranged in a ram air duct 128, through which cold ambient air flows when the aircraft is in flight. When the aircraft is on the ground, by contrast, a fan 130 serves to convey ambient air through the ram air duct 128 in order to cool the first and the second heat exchanger 106, 112. Both when the aircraft is in flight and when it is on the ground, the ambient air flow through the ram air duct 128 is controlled by appropriate positioning of flaps 136, 138 arranged in an inlet region 132 and an outlet region 134 of the ram air duct 128. The fan 130 is arranged with the compressor 108 and the turbine 124 on the common shaft 125, so that not only the compressor 108, but also the fan 130 is driven by the turbine 124. An assembly comprising the turbine 124, the compressor 108 and the fan 130 is usually called an Air Cycle Machine (ACM), where an ACM may also comprise a plurality of turbines, a plurality of compressors and/or a plurality of fans, as required.

In the operation of the air conditioning unit known from the prior art, operating situations may arise in which the temperature of the process air to be supplied to the compressor rises as a result of the operating state of the process air source, for example during takeoff of the aircraft or in the event of a fault, or due to a malfunction of the first heat exchanger. In order to prevent damage to the components of the air conditioning unit and in particular the compressor in such operating situations due to excessive process air temperatures, the cooling capacity of the air conditioning unit must be reduced or the air conditioning unit even completely switched off. However, this results in considerable loss of comfort for the passengers and crew on board the aircraft and in extreme cases may even make it necessary to abort the flight.

Documents EP 1 555 295 and DE 199 63 280 show air conditioning systems in which a cooling device is interposed in the process air supply line, so that the process air flowing through the process air supply line in the region of an end connected to the process air source has a higher temperature than the process air flowing through the process air supply line in the region of an end connected to the compressor.

The object on which the invention is based is to specify a compressor/turbine arrangement, provided for use in an air conditioning unit of an aircraft air conditioning system, which enables continued operation of the air conditioning unit with sufficient cooling capacity in the event of an increase of the temperature of the process air supplied to a compressor. Furthermore, the object on which the invention is based is to provide an air conditioning unit equipped with such a compressor/turbine arrangement for an aircraft air conditioning system and a method for operating such a compressor/turbine arrangement.

This object is achieved by a compressor/turbine arrangement having the features of claim 1, by an air conditioning unit for an aircraft air conditioning system having the features of claim 6 and by a method for operating a compressor/turbine arrangement having the features of claim 8.

A compressor/turbine arrangement according to the invention which is suitable for use in an air conditioning unit of an aircraft air conditioning system comprises a process air supply line which is designed to supply process air generated by a process air source to a compressor. An engine of the aircraft, but also a separately formed compressor, can serve as the process air source. Furthermore, the compressor/turbine arrangement comprises a detection device which is designed to detect a signal characteristic of the temperature of the process air flowing through the process air supply line. The detection device can be embodied, for example, in the form of a temperature sensor. Alternatively or additionally to this, however, it is also possible to use a detection device which is suitable for detecting the pressure of the process air flowing through the process air supply line, since the pressure of the process air flowing through the process air supply line also allows conclusions to be drawn as regards the temperature of the process air, at least when appropriate operating parameters of the process air source are known. If desired, for example for reasons of redundancy, a plurality of detection devices can also be present.

The compressor/turbine arrangement according to the invention furthermore comprises a turbine which is designed to drive the compressor. The turbine can be arranged with the compressor, for example, on a common shaft. Furthermore, there is provided a cooling device which is arranged in a process air line connecting the compressor to the turbine and is designed to cool the process air exiting the compressor and flowing through the process air line in the direction of the turbine. Preferably, the cooling device comprises at least one heat exchanger, where the heat exchanger can be a heat exchanger which is arranged in a ram air duct of the air conditioning unit and through which cold ambient air flows in order to cool the process air flowing through the process air line. Alternatively to this, however, the heat exchanger arranged in the process air line can also be a heat exchanger of the air conditioning unit, through which heat exchanger flows expanded and consequently cooled process air exiting the turbine of the compressor/turbine arrangement, in order to cool the process air flowing through the process air line. If desired, the cooling device can also comprise a plurality of heat exchangers arranged in series in the process air line, where the heat exchangers can be the above-described heat exchangers of the air conditioning unit.

A connecting line of the compressor/turbine arrangement according to the invention branches off from the process air line downstream of the cooling device and opens into the process air supply line. A control device is designed to control a process air flow through the connecting line as a function of the signal detected by the detection device and characteristic of the temperature of the process air flowing through the process air supply line. In other words, under the control of the control device, if necessary cooled process air, which flows through the process air line downstream of the cooling device, can be led via the connecting line into the process air supply line in order to control the temperature of the process air flowing through the process air supply line in the direction of the compressor.

The compressor/turbine arrangement according to the invention makes it possible to react to variations in the temperature of the process air flowing through the process air supply line in the direction of the compressor by appropriate control of the process air flow through the connecting line. In particular, the temperature of the process air flowing through the process air supply line in the direction of the compressor can be effectively reduced by supplying cooled process air from the process air line into the process air supply line. The compressor of the compressor/turbine arrangement according to the invention can thus be operated, also in the event of an increase of the temperature of the process air supplied to the compressor of the compressor/turbine arrangement, with a constant or only slightly reduced compression capacity. As a result, an air conditioning unit equipped with the compressor/turbine arrangement according to the invention can continue to be operated with sufficient cooling capacity, also in the case of an increase of the temperature of the process air flowing through the process air supply line in the direction of the compressor, so that the comfort of the persons on board the aircraft and also an unhindered continuation of the flight can be ensured.

The process air flowing through the process air supply line in the region of an end connected to the process air source has substantially the same temperature as the process air flowing through the process air supply line in the region of an end connected to the compressor. In other words, in the compressor/turbine arrangement according to the invention, the process air source is connected to the compressor/turbine arrangement directly, i.e. without the interposition of a cooling device, embodied for example in the form of a heat exchanger, for cooling the process air flowing through the process air supply line. In the compressor/turbine arrangement according to the invention, the first heat exchanger normally used in known systems (see FIG. 2) can be dispensed with. As a result, the weight and the system complexity of the compressor/turbine arrangement can be advantageously reduced.

Preferably, the control device is designed to control the process air flow through the connecting line and/or the operation of the cooling device in dependence on the signal detected by the detection device and characteristic of the temperature of the process air flowing through the process air supply line in such a manner as to prevent the temperature of the process air flowing through the process air supply line from exceeding a predetermined maximum value. The predetermined maximum value may be, for example, a permissible temperature maximum value, dependent on the desired compression capacity of the compressor, for supplying the process air into the compressor of the compressor/turbine arrangement and lie in a temperature range of 180° C. to 220° C. To control the process air flow through the connecting line, the control device may control, for example, the volume flow of the cooled process air branched off from the process air line. The operation of the cooling device may be controlled by the control device, for example, by suitable control of a cooling medium supply to the cooling device. For example, the control device may control the position of ram air duct inlet and ram air duct outlet flaps, in order to control a flow of cold ambient air through a heat exchanger of the cooling device arranged in a ram air duct.

Furthermore, the control device may be designed to control the operation of the compressor in dependence on the signal detected by the detection device and characteristic of the temperature of the process air flowing through the process air supply line, in such a manner that a temperature increase which the process air undergoes on compression in the compressor does not exceed a permissible maximum value. The permissible maximum value of the temperature increase is preferably chosen such that damage to the compressor and also components of the compressor/turbine arrangement which are arranged downstream of the compressor due to excessive process air temperatures is reliably prevented and lies, for example, in a range of approx. 220° C. to 260°. Under the control of the control device, the compression capacity of the compressor can thus be reduced or the compressor can even be completely switched off if sufficient cooling of the process air flowing through the process air supply line is no longer possible even by appropriate control of the process air flow through the connecting line and of the operation of the cooling device.

The control device of the compressor/turbine arrangement according to the invention is preferably designed, for the control of the process air flow through the connecting line, to control a valve arranged in the connecting line. The valve may be, for example, an electromagnetic valve with a variable flow cross-section. A compressor/turbine arrangement which comprises merely the connecting line and the valve arranged in the connecting line as additional components is distinguished by a particularly low weight and a particularly low complexity.

In a preferred embodiment of the compressor/turbine arrangement according to the invention, furthermore a fan which is designed to be driven by the turbine of the compressor/turbine arrangement is present. The fan may be, for example, a fan which is arranged in a ram air duct of an air conditioning unit equipped with the compressor/turbine arrangement and which serves to convey ambient air through the ram air duct or a heat exchanger arranged in the ram air duct when the aircraft is on the ground. The fan is preferably arranged with the turbine and the compressor of the compressor/turbine arrangement on a common shaft.

Furthermore, the compressor/turbine arrangement according to the invention may comprise a further turbine which is designed to drive the compressor and/or the fan. The process air line may connect the compressor either to the turbine or to the further turbine. What is essential is merely that a cooling device, embodied for example in the form of a heat exchanger, is arranged in the process air line in order to cool the process air flowing through the process air line.

An air conditioning unit according to the invention for an aircraft air conditioning system comprises an above-described compressor/turbine arrangement. Preferably, the air conditioning unit is furthermore designed to drive the compressor and/or the fan of the compressor/turbine arrangement. The motor may be embodied, for example, in the form of an electric motor and serves to ensure a sufficient supply of the compressor and/or the fan with driving energy even if the pressure of the process air supplied to the compressor of the compressor/turbine arrangement is not sufficiently high to enable the driving of the compressor and/or the fan by the turbine alone. The motor may be arranged, for example, with the compressor and the turbine and also, if present, with the fan on a common shaft. In principle, it is conceivable to position the motor at different positions on the shaft.

In a method according to the invention for operating a compressor/turbine arrangement provided for use in an air conditioning unit of an aircraft air conditioning system, process air generated by a process air source is supplied to a compressor through a process air supply line. Furthermore, a signal characteristic of the temperature of the process air flowing through the process air supply line is detected. The process air exiting the compressor is cooled by means of a cooling device which is arranged in a process air line connecting the compressor to a turbine. The cooled process air is supplied to the turbine which is designed to drive the compressor. A process air flow through a connecting line, branching off from the process air line downstream of the cooling device and opening into the process air supply line, is controlled in dependence on the detected signal characteristic of the temperature of the process air flowing through the process air supply line.

Preferably, the process air flow through the connecting line and/or the operation of the cooling device is controlled in dependence on of the signal detected by the detection device and characteristic of the temperature of the process air flowing through the process air supply line in such a manner as to prevent the temperature of the process air flowing through the process air supply line from exceeding a predetermined maximum value.

Furthermore, the operation of the compressor is controlled in dependence on the signal detected by the detection device and characteristic of the temperature of the process air flowing through the process air supply line in such a manner that a temperature increase which the process air undergoes on compression in the compressor does not exceed a permissible maximum value.

The process air flow through the connecting line may be controlled by controlling a valve arranged in the connecting line.

Furthermore, a fan may be driven by the turbine of the compressor/turbine arrangement.

Finally, a further turbine may drive the compressor and/or the fan, the process air line connecting the compressor either to the turbine or to the further turbine.

Figure 3:
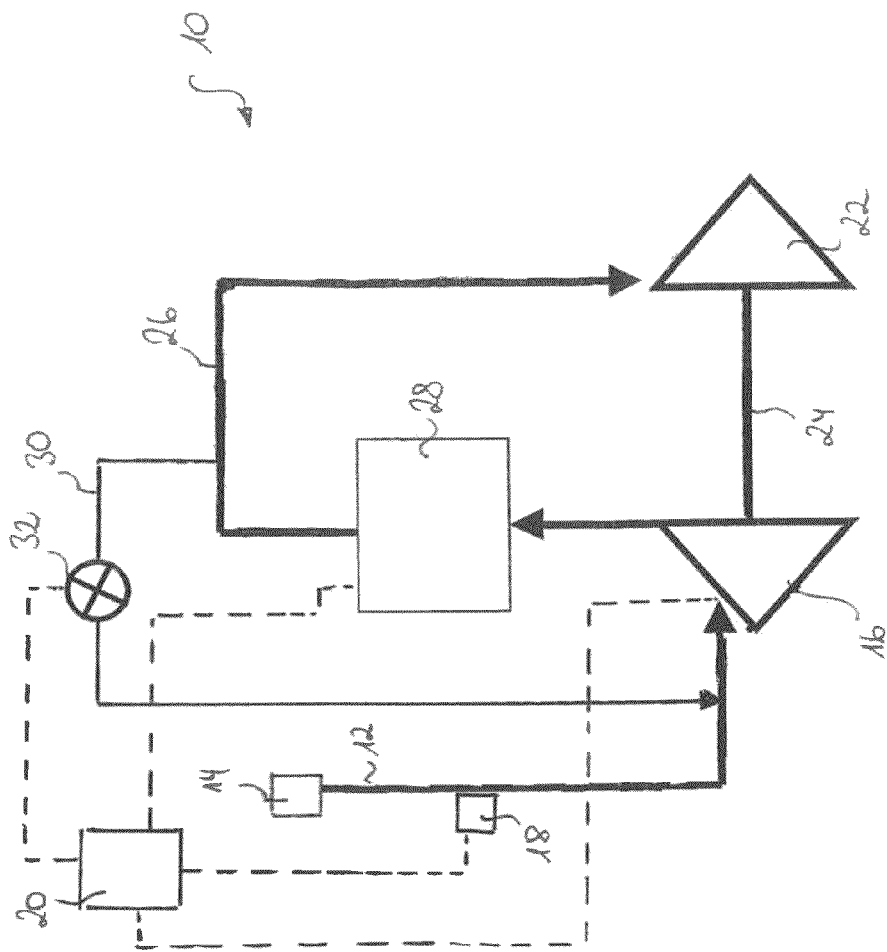
Figure 4:
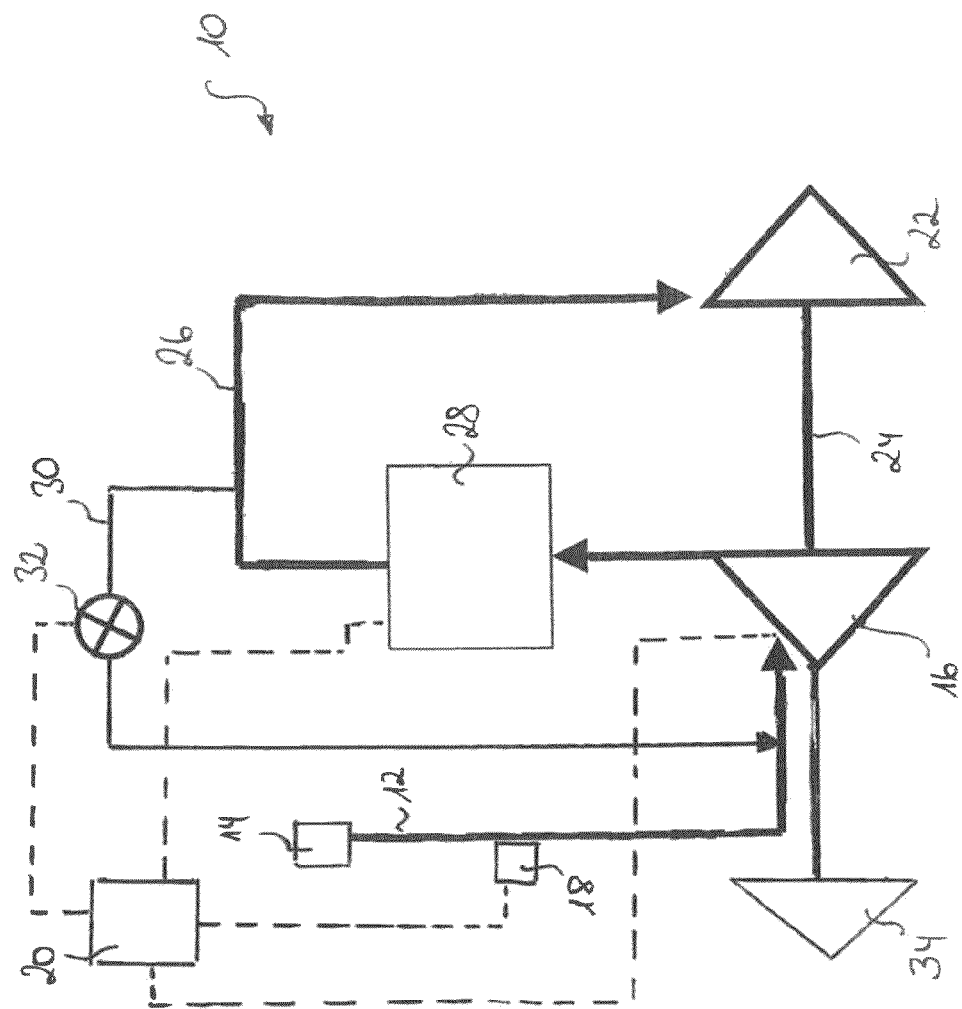
Figure 5:
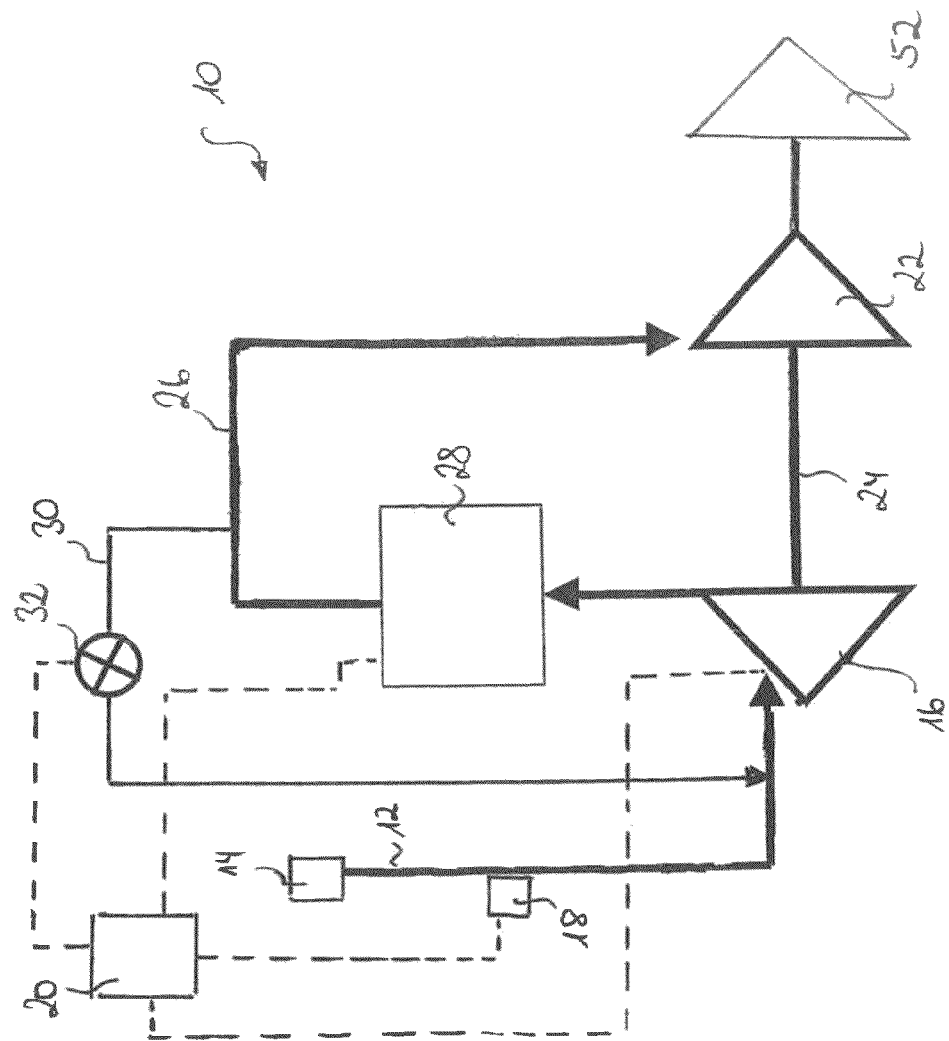
Figure 6:
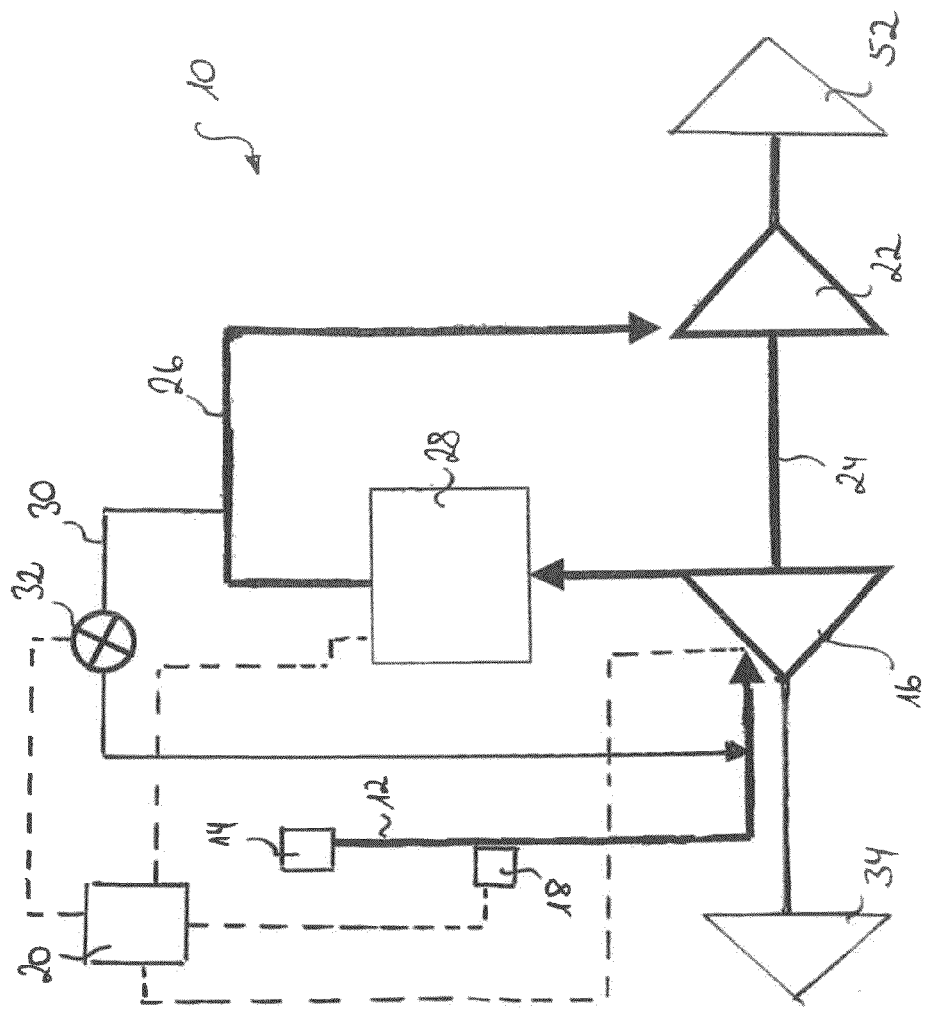
Figure 7:
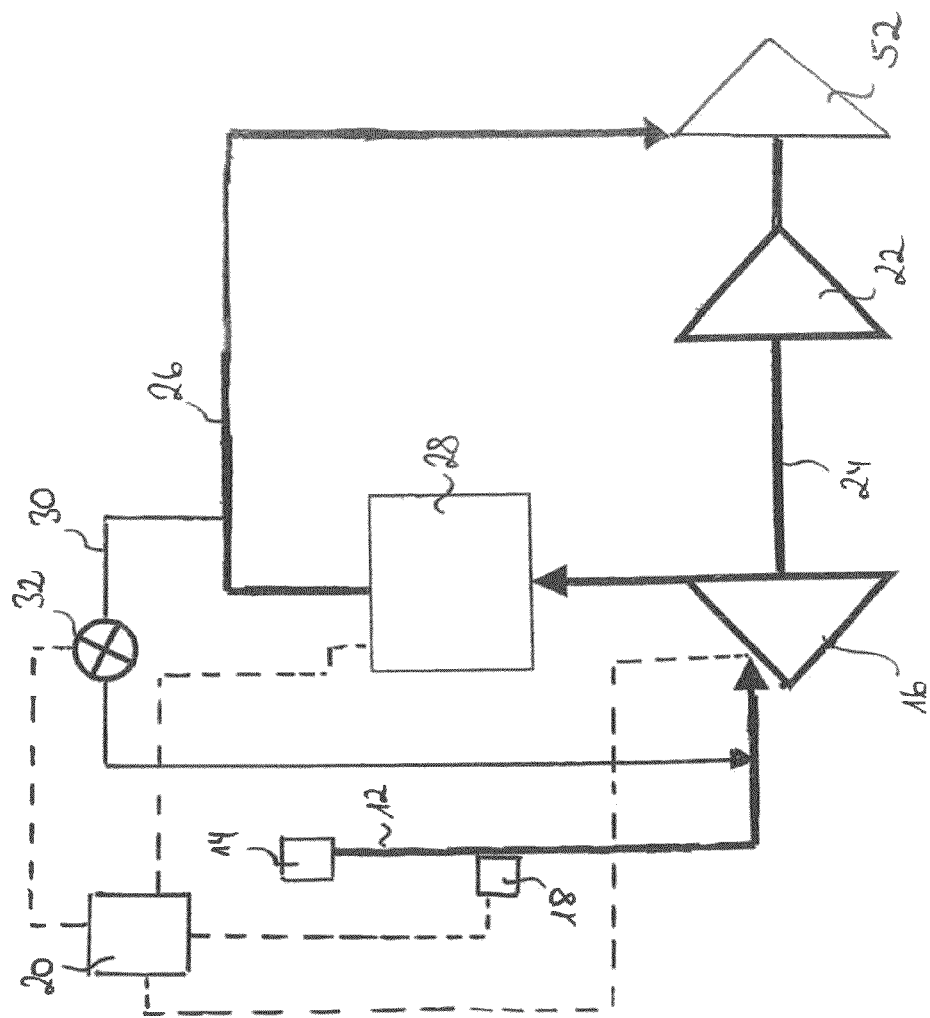
Figure 8:
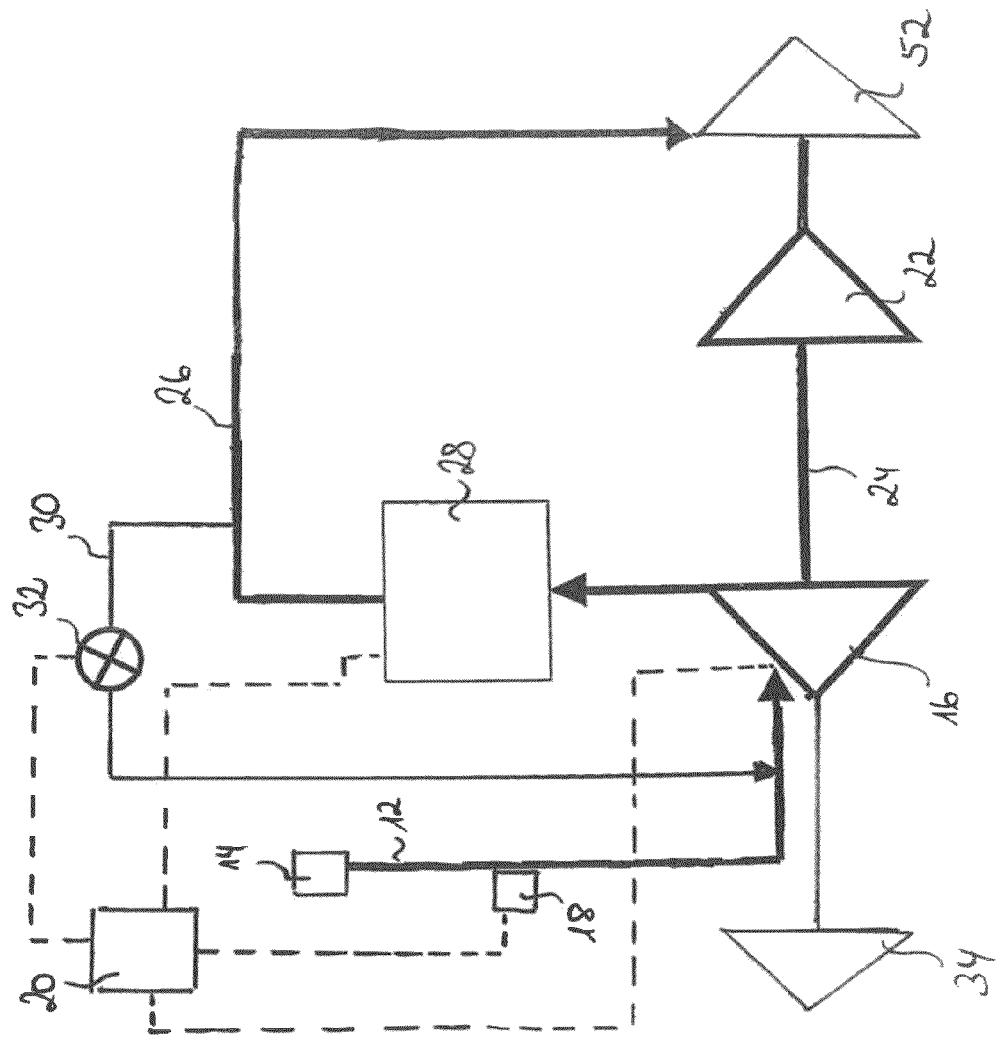
Figure 9:
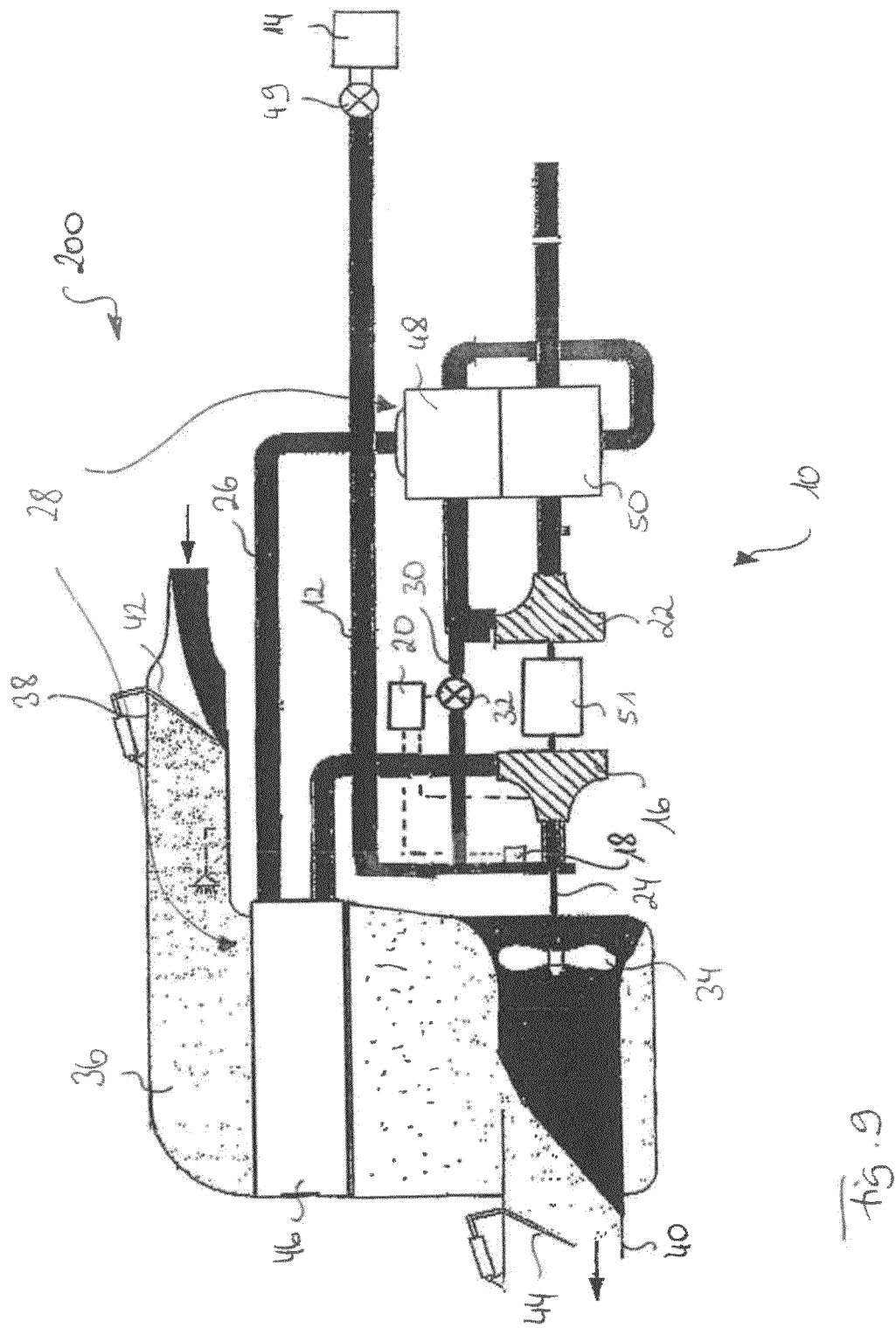

A preferred embodiment of the invention will now be explained in more detail with reference to the appended schematic drawings, of which FIG. 1 shows a representation of the operating principle of a known aircraft air conditioning system, FIG. 2 shows the structure of an air conditioning unit suitable for use in a known aircraft air conditioning system, FIG. 3 shows a first embodiment of a compressor/turbine arrangement suitable for use in an air conditioning unit of an aircraft air conditioning system, FIG. 4 shows a second embodiment of a compressor/turbine arrangement suitable for use in an air conditioning unit of an aircraft air conditioning system, FIG. 5 shows a third embodiment of a compressor/turbine arrangement suitable for use in an air conditioning unit of an aircraft air conditioning system, FIG. 6 shows a fourth embodiment of a compressor/turbine arrangement suitable for use in an air conditioning unit of an aircraft air conditioning system, FIG. 7 shows a fifth embodiment of a compressor/turbine arrangement suitable for use in an air conditioning unit of an aircraft air conditioning system, FIG. 8 shows a sixth embodiment of a compressor/turbine arrangement suitable for use in an air conditioning unit of an aircraft air conditioning system, and FIG. 9 shows an air conditioning unit suitable for use in an aircraft air conditioning system and equipped with a compressor/turbine arrangement according to FIG. 4.

FIGS. 3 to 8 show different embodiments of a compressor/turbine arrangement 10 which is suitable for use in an air conditioning unit 200 of an aircraft air conditioning system depicted in FIG. 9. The compressor/turbine arrangement 10 shown in FIG. 3 comprises a process air supply line 12, the first end of which is connected to a process air source 14. In the embodiments of the compressor/turbine arrangement 10 shown in the figures, the process air source 14 is formed by an aircraft engine. The process air flowing through the process air supply line 12 is bled from the aircraft engine at a comparatively low compressor stage. The process air flowing through the process air line 12 in the region of an end connected to the process air source 14 therefore has a lower pressure and also a lower temperature than the process air flowing through an end, connected to the process air source 103, of the process air supply line 102 of the air conditioning system 100 known from the prior art and depicted in FIG. 2.

A second end of the process air supply line 12 is connected to a compressor 16. The process air supply line 12 supplies process air generated by the process air source 14 to the compressor 16 directly, i.e. without the interposition of a cooling device for cooling the process air. The first heat exchanger 106 of the air conditioning unit 100 known from the prior art according to FIG. 2 is thus dispensed with in the compressor/turbine arrangement 10. The process air flowing through the process air supply line 12 in the region of its first end connected to the process air source 14 consequently has substantially the same temperature as the process air flowing through the process air supply line 12 in the region of its second end connected to the compressor 16.

Arranged in the process air supply line 12 is a detection device 18 which is designed to detect a signal characteristic of the temperature of the process air flowing through the process air supply line 12. In the embodiments of the compressor/turbine arrangement 10 depicted in the figures, the detection device 18 is embodied in the form of a temperature sensor. The signals detected by the detection device 18 are supplied to a control device 20 embodied in the form of an electronic control unit.

The compressor/turbine arrangement 10 furthermore comprises a turbine 22 which is designed to drive the compressor 16 and is arranged with the compressor 16 on a common shaft 24. A process air line 26 connects the compressor 16 to the turbine 22, so that compressed and heated process air exiting the compressor 16 can be led via the process air line 26 to the turbine 22. Arranged in the process air line 26 is a cooling device 28 which serves to cool the process air flowing through the process air line 26. For example, the cooling device 28 may comprise at least one heat exchanger. In the cooling device 28 the process air undergoes a cooling to a temperature which is below the temperature of the process air supplied by the process air source 14 to the process air supply line in the normal operation of the process air source 14.

A connecting line 30 branches off from the process air line 26 downstream of the cooling device 28 and opens into the process air supply line 12 downstream of the compressor 16. Arranged in the connecting line 30 is a valve 32, embodied in the form of an electromagnetic valve with a variable flow cross-section, for controlling the process air flow through the connecting line 30. The operation of the valve 32 is controlled by the control device 20.

In the normal operation of the compressor/turbine arrangement 10, i.e. when the process air flowing through the process air supply line 12 has a temperature lying below a permissible maximum temperature of approx. 180° C. to 220° C., the valve 32 remains closed, so that the process air flowing through the process air line 26 downstream of the cooling device 28 is supplied solely to the turbine 22. If the control device 20, by contrast, ascertains on the basis of the signals transmitted to it by the detection device 18 that the temperature of the process air flowing through the process air supply line 12 exceeds the permissible maximum temperature, the control device 20 moves the valve 32 into an open position. In particular, the control device 20 controls the flow cross-section of the valve 32 in dependence on the signals detected by the detection device 18 in such a manner that the temperature of the process air flowing through the process air supply line 12 is reduced below the permissible maximum valve by the supply of cooler process air from the process air line 26. Since the process air flowing through the process air line 26 downstream of the compressor 16 has a higher pressure, owing to the compression of the process air in the compressor 16, than the process air flowing through the process air supply line 12, a conveying device for conveying the process air, flowing through the process air line 26, through the connecting line 30 into the process air supply line 12 can be dispensed with.

If the control device 20 ascertains, on the basis of the signal transmitted to it by the detection device 18, that the supply of process air, flowing through the process air line 26, into the process air supply line 12 is not sufficient to reduce the temperature of the process air flowing through the process air supply line 12 below the predetermined maximum valve, the control device 20 may also control the operation of the cooling device 28 in such a manner that the cooling capacity of the cooling device 28 is increased. A control of the operation of the cooling device 28 by the control device 20 is also possible if the control device 20 detects that the branching-off of too great a process air volume flow from the process air line 26 is required for the reduction of the temperature of the process air flowing through the process air supply line 12 below the predetermined maximum value. In principle, however, the control of the process air flow branched off from the process air line 26 is given priority over the control of the operation of the cooling device 28.

Appropriate control of the process air flow branched off from the process air line 26 and/or appropriate control of the operation of the cooling device 28 by the control device 20 reliably prevents the temperature of the process air, on compression in the compressor 16 at a predetermined compression capacity of the compressor 16, from rising above a predetermined maximum value of approx. 220° C. to 260° C. This prevents damage to the compressor 16 and/or components of the compressor/turbine arrangement 10 arranged downstream of the compressor 16 due to excessive process air temperatures. Consequently, the compressor/turbine arrangement 10 and an air conditioning unit 200 equipped with the compressor/turbine arrangement 10 can continue to be operated even if, during takeoff of the aircraft or in the event of a fault, the process air supplied by the process air source 14 to the process air supply line 12 has a temperature lying above the permissible maximum temperature value for the process air to be supplied to the compressor 16.

If the control device 20 ascertains that the temperature of the process air supplied by the process air source 14 to the process air supply line 12 cannot be reduced below the predetermined maximum value of 220° C. before the process air enters the compressor 16 by supplying cooler process air from the connecting line 30, the control device 20 controls the operation of the compressor 16 in such a manner that the compression capacity of the compressor 16 is decreased and consequently the heating of the process air on flowing through the compressor 16 is reduced. Given a constant cooling capacity of the cooling device 28, cooler air is thus available downstream of the cooling device 28 and can be led via the connecting line 30 into the process air supply line 12. Only if the temperature of the process air flowing through the process air line 26 cannot be sufficiently decreased, even by decreasing the compression capacity of the compressor 16, to reduce a reduction of the process air flowing through the process air supply line 12 below the permissible maximum value of 220° C., is the compressor/turbine arrangement 10 switched off by the control device 20 to prevent damage to the compressor 16 and also components of the compressor/turbine arrangement 10 arranged downstream of the compressor 60 due to excessively hot process air.

An embodiment of the compressor/turbine arrangement 10 shown in FIG. 4 differs from the arrangement according to FIG. 3 in that a fan 34 is arranged with the compressor 16 and the turbine 22 on the common shaft 24. Otherwise, the structure and functioning of the compressor/turbine arrangement 10 according to FIG. 4 correspond to the structure and functioning of the compressor/turbine arrangement from FIG. 3.

As can be seen from FIG. 9, the fan 34 serves to convey ambient air through a ram air duct 36 of the air conditioning unit 200 equipped with the compressor/turbine arrangement 10 when the aircraft is on the ground. Flaps 42, 44 for controlling the ambient air flow through the ram air duct 36 are respectively provided in an inlet region 38 and an outlet region 40 of the ram air duct 36. In the air conditioning unit 200 according to FIG. 9, the cooling device 28 is formed by a heat exchanger 46 arranged in the ram air duct 36 and a further heat exchanger 48 arranged downstream of the heat exchanger 46. The heat exchanger 46 of the air conditioning unit 200 shown in FIG. 9 corresponds, in respect of its structure and function, to the second heat exchanger 112 in the air conditioning unit 100 known from the prior art and shown in FIG. 2. Similarly, the further heat exchanger 48 of the air conditioning unit 200 according to FIG. 9 corresponds, in respect of its structure and function, to the third heat exchanger 116 of the air conditioning unit 100 known from the prior art and depicted in FIG. 2. Furthermore, the air conditioning unit 200 comprises a valve 49, corresponding to the valve 104 in the known air conditioning unit 100 according to FIG. 2, for controlling the process air supply from the process air source 14 into the process air supply line 12 and also a third heat exchanger 50 corresponding to the fourth heat exchanger 118 of the air conditioning unit 100 according to FIG. 2.

Since the process air which is supplied by the process air source 14 to the compressor 16 in the air conditioning unit 200 according to FIG. 9 has a lower pressure than the process air supplied to the compressor 108 in the air conditioning unit 100 known from the prior art and illustrated in FIG. 2, the air conditioning unit 200 is provided with a motor 51 embodied in the form of an electric motor. The motor 51 is arranged with the fan 34, the compressor 16 and the turbine 22 on the common shaft 24 and serves to supply the compressor 16 and the fan 34 with sufficient driving energy if the driving power provided by the turbine 22 is insufficient due to the fact that the process air pressure is too low.

In the embodiment of an air conditioning unit 200 shown in FIG. 9, the motor 51 is arranged between the compressor 16 and the turbine 22. Alternatively to this, however, configurations in which the motor 51 is arranged on the shaft 24 to the right of the turbine 22 or to the left of the compressor 16, either between the fan 34 and the compressor 16 or to the left of the fan 34, are also conceivable. Furthermore, configurations in which the motor 51 drives merely the compressor or the fan 34 are conceivable.

The embodiment of a compressor/turbine arrangement 10 depicted in FIG. 5 differs from the arrangement according to FIG. 3 in that the compressor/turbine arrangement 10 comprises a further turbine 52. The further turbine 52 is arranged with the compressor 16 and the turbine 22 on the common shaft 24. Otherwise, the structure and functioning of the compressor/turbine arrangement 10 according to FIG. 5 correspond to the structure and functioning of the compressor/turbine arrangement from FIG. 3.

The compressor/turbine arrangement 10 shown in FIG. 6 differs from the arrangement according to FIG. 4 in that the compressor/turbine arrangement 10 comprises a further turbine 52. The further turbine 52 is arranged with the fan 34, the compressor 16 and the turbine 22 on the common shaft 24. Otherwise, the structure and functioning of the compressor/turbine arrangement 10 according to FIG. 6 correspond to the structure and functioning of the arrangement illustrated in FIG. 4.

The compressor/turbine arrangement 10 depicted in FIG. 7 differs from the arrangement according to FIG. 5 merely in that the process air line 26 no longer connects the compressor 16 to the turbine 22, but to the further turbine 52. Otherwise, the structure and functioning of the compressor/turbine arrangement 10 according to FIG. 7 correspond to the structure and functioning of the arrangement from FIG. 5.

The compressor/turbine arrangement 10 according to FIG. 8 differs from the arrangement depicted in FIG. 6 merely in that the process air line 26 no longer connects the compressor 16 to the turbine 22, but to the further turbine 52. Otherwise, the structure and functioning of the compressor/turbine arrangement 10 according to FIG. 8 correspond to the structure and functioning of the arrangement illustrated in FIG. 6.

Features described above in connection with individual embodiments of the compressor/turbine arrangement 10 or the air conditioning unit 200 can also be combined with other embodiments of the compressor/turbine arrangement 10 or the air conditioning unit 200. For example, the air conditioning unit 200 can be equipped with any desired embodiment of the compressor/turbine arrangement 10 and a motor 51. Furthermore, the compressor/turbine arrangement 10 can be supplemented by further compressors and/or turbines, as required.

The invention claimed is:

1. Compressor/turbine arrangement for use in an air conditioning unit of an aircraft air conditioning system, having:
    a process air supply line which is designed to supply process air generated by a process air source to a compressor,
    a detection device which is designed to detect a signal characteristic of the temperature of the process air flowing through the process air supply,
    a turbine which is designed to drive the compressor,
    a cooling device which is arranged in a process air line connecting the compressor to the turbine and is designed to cool the process air exiting the compressor and flowing through the process air line in the direction of the turbine,
    a connecting line which branches off from the process air line downstream of the cooling device and opens into the process air supply line,
    a control device which is designed to control a process air flow through the connecting line in dependence on the signal detected by the detection device and characteristic of the temperature of the process air flowing through the process air supply line, there being no cooling device interposed in the process air supply line so that the process air flowing through the process air supply line in the region of an end connected to the process air source has substantially the same temperature as the process air flowing through the process air supply line in the region of an end connected to the compressor.

2. Compressor/turbine arrangement according to claim 1, characterised in that the control device is designed to control the process air flow through the connecting line and/or the operation of the cooling device in dependence on the signal detected by the detection device and characteristic of the temperature of the process air flowing through the process air supply line in such a manner as to prevent the temperature of the process air flowing through the process air supply line from exceeding a predetermined maximum value, and/or in that the control device is designed to control the operation of the compressor in dependence on the signal detected by the detection device and characteristic of the temperature of the process air flowing through the process air supply line, in such a manner that a temperature increase which the process air undergoes on compression in the compressor does not exceed a permissible maximum value.

3. Compressor/turbine arrangement according to claim 1, characterised in that the control device is designed, for controlling the process air flow through the connecting line, to control a valve arranged in the connecting line.

4. Compressor/turbine arrangement according to claim 1, characterised by a fan which is designed to be driven by the turbine of the compressor/turbine arrangement.

5. Compressor/turbine arrangement according to claim 4, characterised by a further turbine which is designed to drive the compressor and/or the fan, the process air line connecting the compressor either to the turbine or to the further turbine.

6. Air conditioning unit for an aircraft air conditioning system, characterised by a compressor/turbine arrangement according to claim 4.

7. Air conditioning unit according to claim 6, characterised by a motor which is designed to drive the compressor and/or the fan of the compressor/turbine arrangement.

8. Method for operating a compressor/turbine arrangement provided for use in an air conditioning unit of an aircraft air conditioning system, having the steps:
supplying process air, generated by a process air source, to a compressor through a process air supply line in which no cooling device is provided,
detecting a signal characteristic of the temperature of the process air flowing through the process air supply line,
cooling the process air exiting the compressor by means of a cooling device which is arranged in a process air line connecting the compressor to a turbine, the turbine being designed to drive the compressor,
supplying the cooled process air to the turbine,
controlling a process air flow through a connecting line, branching off from the process air line downstream of the cooling device and opening into the process air supply line in dependence on the detected signal characteristic of the temperature of the process air flowing through the process air supply line, the process air flowing through the process air supply line in the region of an end connected to the process air source having substantially the same temperature as the process air flowing through the process air supply line in the region of an end connected to the compressor.

9. Method according to claim 8, characterised in that the process air flow through the connecting line and/or the operation of the cooling device is/are controlled in dependence on the detected signal characteristic of the temperature of the process air flowing through the process air supply line in such a manner as to prevent the temperature of the process air flowing through the process air supply line from exceeding a predetermined maximum value, and/or in that the operation of the compressor is controlled in dependence on the signal detected by the detection device and characteristic of the temperature of the process air flowing through the process air supply line, in such a manner that a temperature increase which the process air undergoes on compression in the compressor does not exceed a permissible maximum value.

10. Method according to claim 8, characterised in that the process air flow through the connecting line is controlled by the control of a valve arranged in the connecting line.

11. Method according to claim 8, characterised in that a fan is driven by the turbine of the compressor/turbine arrangement.

12. Method according to claim 11, characterised in that a further turbine drives the compressor and/or the fan, the process air line connecting the compressor either to the turbine or to the further turbine.

* * * * *